(12) United States Patent
Yang et al.

(10) Patent No.: US 10,641,682 B2
(45) Date of Patent: May 5, 2020

(54) LIGHT LEAKAGE DETECTION IN EDGE SEALANTS OF OPTICAL DEVICES

(71) Applicant: Magic Leap, Inc., Plantation, FL (US)

(72) Inventors: Ming Yang, Plantation, FL (US); Wendong Xing, Plantation, FL (US); Eric C. Browy, Coral Springs, FL (US); William Hudson Welch, Fort Lauderdale, FL (US); Thomas Mercier, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/438,683

(22) Filed: Jun. 12, 2019

(65) Prior Publication Data

US 2019/0383697 A1     Dec. 19, 2019

Related U.S. Application Data

(60) Provisional application No. 62/684,478, filed on Jun. 13, 2018.

(51) Int. Cl.
*G01M 11/02*     (2006.01)
*G02B 27/01*     (2006.01)

(52) U.S. Cl.
CPC .... *G01M 11/0207* (2013.01); *G01M 11/0285* (2013.01); *G02B 27/0101* (2013.01)

(58) Field of Classification Search
CPC ............. G01M 11/02; G01M 11/0207; G01M 11/0285; G02B 27/01; G02B 27/0101
USPC ........................................................ 356/124
See application file for complete search history.

(56) References Cited

U.S. PATENT DOCUMENTS

| | | | |
|---|---|---|---|
| 7,684,031 B2 | 3/2010 | Yokota et al. | |
| 8,687,874 B2 | 4/2014 | Hiraoka | |
| 2007/0127118 A1* | 6/2007 | Nilson | ................... A01K 1/031 359/385 |
| 2009/0097737 A1 | 4/2009 | Hashimoto et al. | |
| 2018/0045940 A1 | 2/2018 | Kobayashi et al. | |

OTHER PUBLICATIONS

PCT International Search Report and Written Opinion in International Appln. No. PCT/US2019/036846, dated Aug. 22, 2019, 7 pages.

* cited by examiner

*Primary Examiner* — Roy M Punnoose
(74) *Attorney, Agent, or Firm* — Fish & Richardson P.C.

(57) ABSTRACT

Techniques are described for inspecting optical devices, such as eyepieces, to determine whether they exhibit light leakage through an edge sealant that has been applied to the device. Embodiments provide an inspection apparatus that can be employed to detect the leakage of light through an edge sealant of an optical device, where the edge sealant is applied to prevent, or at least reduce, the leakage of light from the optical device. Light from a light source is projected into the optical device. The light can travel along one or more wave guides within the device, until reaching an edge of the device. Light that is able to leak through an edge sealant can be reflected, using mirror(s) in the apparatus, and detected by a camera. Image(s) captured by the camera can be analyzed to determine the performance of the optical device with respect to edge leakage.

20 Claims, 5 Drawing Sheets

LIGHT LEAKAGE DETECTION IN EDGE SEALANTS OF OPTICAL DEVICES

CROSS-REFERENCE TO RELATED APPLICATION

This application claims the benefit of U.S. Application No. 62/684,478 entitled "LIGHT LEAKAGE DETECTION IN EDGE SEALANTS OF OPTICAL DEVICES" and filed on Jun. 13, 2018, which is incorporated by reference herein in its entirety.

BACKGROUND

In optical devices, light can be directed and/or manipulated to achieve a desired effect. For example, in an optical device such as an eyepiece used in a virtual reality interface, visible light can be directed and/or manipulated to provide image data that is perceived by a user. Various types of optical devices may be subjected to testing, during and/or after manufacture, to ensure that the devices are manufactured and/or operate according to desired specifications. For example, in some types of optical devices, it may be advantageous to reduce or eliminate the leakage of light out of the device.

SUMMARY

Embodiments of the present disclosure are generally directed to techniques for detecting light leakage from optical devices. More specifically, embodiments are directed to at least one apparatus and/or at least one method for detecting and quantifying light leakage through a sealant that is applied to edge(s) of an optical device such as an eyepiece.

In general, innovative aspects of the subject matter described in this specification can be embodied as an inspection apparatus that includes: a stage including a surface, an opening, and one or more mirror support structures that each supports a respective mirror; a light source that is below the stage and that is arranged to project light through the opening of the stage and into a portion of the eyepiece when the eyepiece is resting on the surface of the stage, the eyepiece having multiple optics layers and an edge sealant along at least one edge of the eyepiece; an enclosure that encloses the stage and the light source to isolate the eyepiece from external light from outside the enclosure; and a camera that is arranged to capture, through an aperture in the enclosure, at least one image of an interior of the enclosure, the at least one image including at least a portion of the light that leaks through the edge sealant of the eyepiece and that is reflected to the camera by the at least one mirror.

Embodiments can optionally include one or more of the following features.

In some embodiments, the inspection apparatus further includes an analysis module that receives the at least one image from the camera and that analyzes the at least one image to quantify light leakage through the edge sealant of the eyepiece.

In some embodiments, the stage further includes a block that is between the opening and the camera and that prevents the light projected by the light source from directly reaching the camera.

In some embodiments, the one or more mirror support structures each supports the respective mirror to be disposed at approximately a 45 degree angle with respect to the surface of the stage.

In some embodiments, the camera includes a telecentric lens.

In some embodiments, the apparatus includes the eyepiece.

In some embodiments, the projected light is white light.

In some embodiments, the light is projected into the portion of the eyepiece that includes at least one color filter to separate the white light into a plurality of color bands.

In some embodiments, the eyepiece includes multiple layers, each layer of the multiple layers including a respective wave guide for a particular color band.

In some embodiments, the at least one image includes pixels of at least one color band to indicate light leakage through the edge sealant corresponding to at least one particular layer of the eyepiece.

In general, innovative aspects of the subject matter described in this specification can be embodied as a method of inspecting an eyepiece, including positioning an eyepiece on a stage defining an opening, wherein the eyepiece comprises an edge sealant along at least one edge of the eyepiece; enclosing the stage to isolate the eyepiece from external light outside the enclosure; providing light from a light source inside the enclosure through the opening and toward the eyepiece; capturing, through an aperture in the enclosure, an image of an interior of the enclosure; and assessing, based on the image, light leakage from the eyepiece through the edge sealant.

Embodiments can optionally include one or more of the following features.

In some embodiments, light from the light source comprises white light.

In some embodiments, the eyepiece comprises a color filter configured to separate the white light into a plurality of color bands, and the method further includes providing the light toward the eyepiece comprises providing the light to the color filter. The eyepiece can include multiple optics layers, each layer of which includes a wave guide for a particular color band, and the image includes pixels of at least one color band, thereby indicating leakage of the light through the edge sealant corresponding to at least one layer of the multiple optics layers.

Some embodiments include identifying a number of layers of the multiple optics layers through which leakage of the light occurs.

Some embodiments include identifying a location on the eyepiece corresponding to the leakage of the light. Some embodiments include identifying, based on the pixels of the at least one color band, the at least one layer associated with the leakage of the light. Some embodiments further include assessing a number of the pixels of the at least one color band in the image.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DETAILED DESCRIPTION

Embodiments of the present disclosure are directed to techniques for detecting light leakage from optical devices. In particular, embodiments provide an inspection apparatus that can be employed to detect the leakage of light through an edge sealant of an optical device, where the edge sealant is applied to prevent, or at least reduce, the leakage of light from the optical device. In some examples, the optical device being inspected is an eyepiece that has been manufactured for use in a virtual reality, augmented reality, and/or computer vision interface device, or to deliver images data, video data, graphics data, and/or other types of visually perceivable information to a user who is wearing or otherwise using the interface device.

In some examples, manufacture of an eyepiece can include the application of a polymer sealant, or other type of sealant, around the edge(s) of the eyepiece. The sealant may accordingly be described as an edge sealant. The sealant may be applied to absorb light coming out of the eyepiece, and to prevent light from reflecting back into the eyepiece and degrading optical performance of the eyepiece. In experiments conducted on an example eyepiece, when sealant is applied in a faulty manner with gaps, flaws, or inconsistencies, tests showed that the eyepiece exhibited optical defects such as degraded contrast. To ensure the quality and performance of the eyepiece, the inspection apparatus described herein can be used to detect flaws in the sealant coverage, such as gaps, inconsistencies, or irregularities that could allow light reflection that may degrade the performance of the eyepiece. In addition to providing structural support for the multi-layer eyepiece, the edge sealant also acts as a light sink, preventing light from being reflected back into the waveguides of the eyepiece as the light reaches the edge of the eyepiece. The light leakage, which can be detected using the techniques described herein, may not directly affect eyepiece quality, but it provides an indicator of poor edge seal coverage which may lead to light reflection which affects the contrast of the eyepiece.

Figure 1:
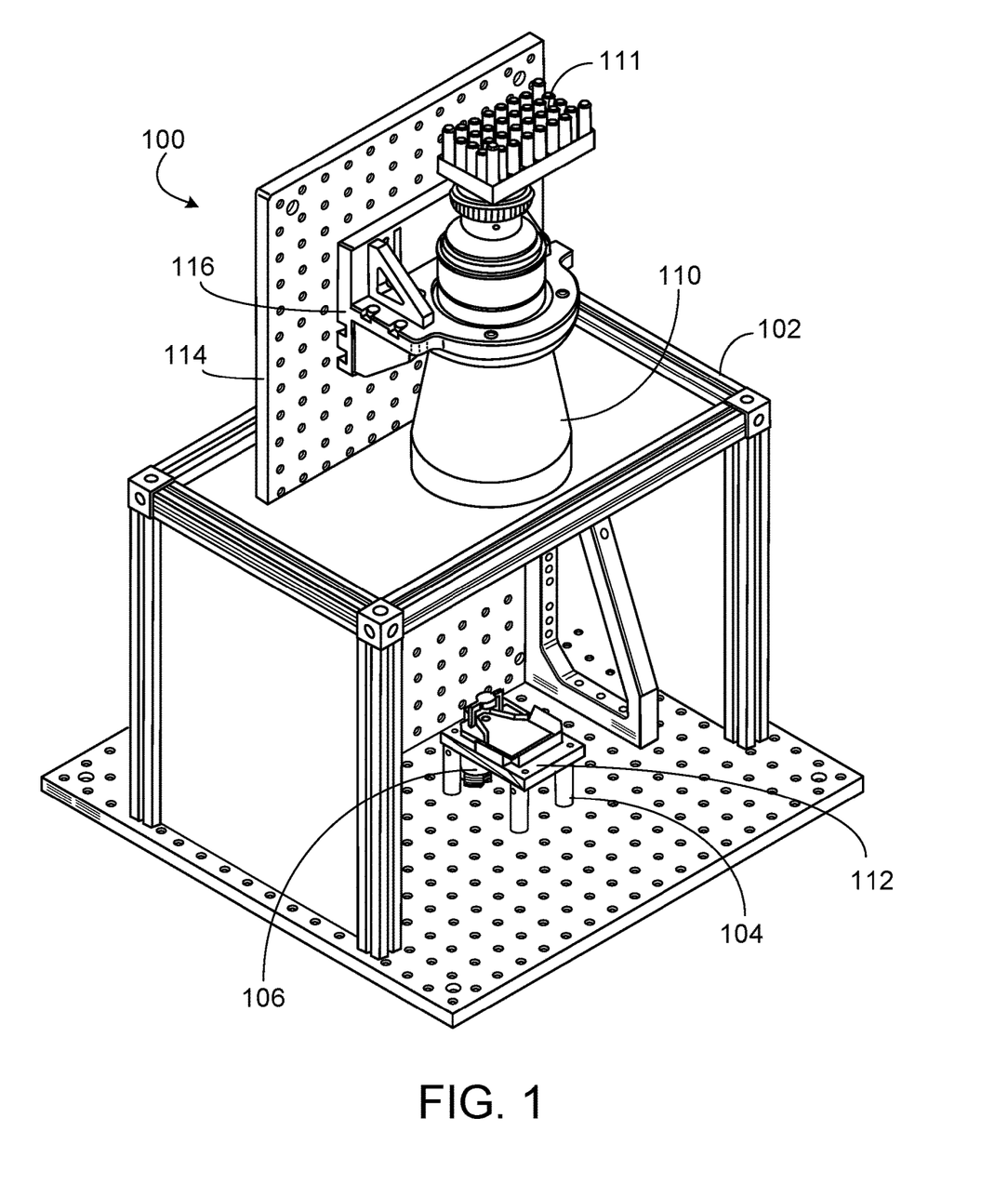
FIG. 1 depicts a schematic of an example inspection apparatus, according to embodiments of the present disclosure.

FIG. 1 depicts a schematic of an example inspection apparatus 100, according to embodiments of the present disclosure. The inspection apparatus 100 is also described herein as the apparatus. The apparatus 100 can include an enclosure 102 that is composed of a material and/or constructed to prevent external light from entering the interior of the enclosure 102. In some embodiments, the enclosure 102 is black. The enclosure 102 can include four walls, a bottom, and a top, as shown in the example of FIG. 1. In some embodiments, a front wall of the enclosure 102 is a (e.g., sliding and/or removable) wall that functions as a door to provide access to the inside of the enclosure 102. This wall may be closed during operation of the inspection apparatus. FIG. 1 shows an example in which this wall is open, to show the stage 104 and light source 106 inside the enclosure.

The stage 104 can be configured to support an eyepiece or other type of optical device that is being inspected. The stage 104 is described further with reference to FIG. 2. The light source 106 can be arranged below the stage 104, and disposed to project light upward into a portion of the eyepiece that has been placed on the stage 104. The stage 104 can be supported by one or more (e.g., four) stage supports 112, which hold the stage 104 at an appropriate distance above the bottom of the enclosure 102, to provide sufficient clearance for the light source 106 under the stage 104. In some embodiments, the light source 106 is at least one light emitting diode (LED). In some embodiments, the light source 106 emits white light. By enclosing the light source 106 and stage 104 (and eyepiece being tested) within the substantially dark interior of the enclosure 102, the apparatus 110 can ensure that little or no external light is able to penetrate to the eyepiece while it is being inspected for edge sealant light leakage.

The apparatus 100 can also include at least one camera 110. In some embodiments, a single camera 110 is employed, and the camera 110 may include a telecentric lens. The camera 110 may be disposed above the stage 104 and eyepiece, and may have visibility to the interior of the enclosure 102 through an aperture in the top of the enclosure 102. Through the aperture, the camera 110 can capture one or more images of the interior of the enclosure while the light source 106 is illuminating a portion of the eyepiece resting on the stage 104. The captured image(s) can be of a field of view that includes the stage 104, the eyepiece on the stage 104, and any light reflected by the mirror(s) on the stage 104. The image(s) can be analyzed to determine whether they exhibit light leakage through the edge sealant of the eyepiece being inspected, as described further below.

In some embodiments, the camera 110 is communicatively coupled to an analysis component, such as a computing device. In some embodiments, the camera 110 includes the analysis component (e.g., analysis component 111), such that the camera 110 can perform at least a portion of the image analysis. The image(s) may be communicated to the analysis component via one or more signals that are transmitted, over a wired or wireless connection, from the camera 110 to the analysis component. The analysis component can analyze the image(s) to determine whether the eyepiece under inspection is exhibiting any light leakage. The apparatus 100 can also include a back plate 114 coupled to the top of the enclosure 102, and a camera holder 116 (e.g., bracket) coupled to the back plate 114, the back plate 114 and camera holder 116 arranged to secure and stabilize the camera 110 during inspection of an eyepiece.

Figure 2:
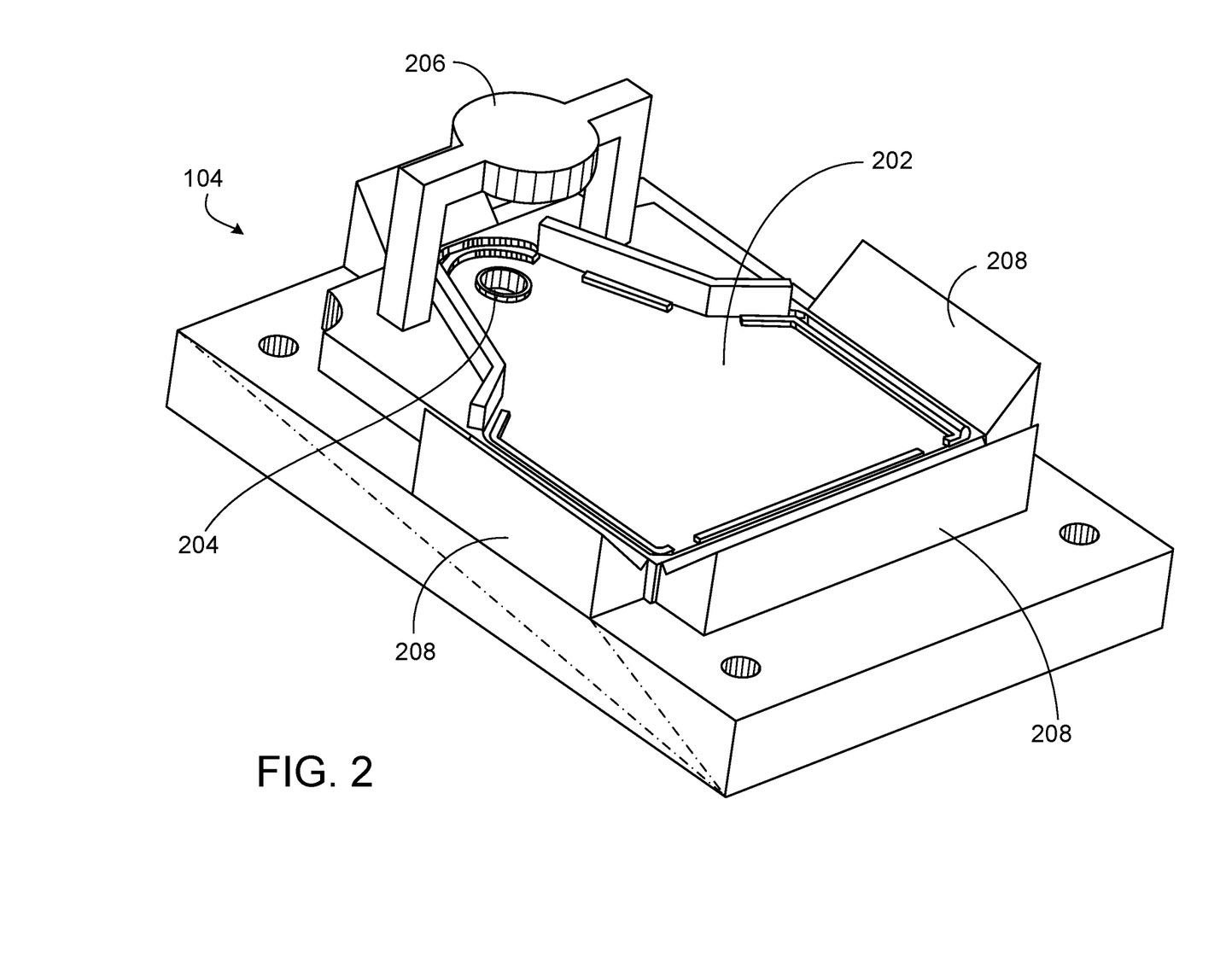
FIG. 2 depicts a schematic of an example stage included in the inspection apparatus, according to embodiments of the present disclosure.

FIG. 2 depicts a schematic of an example stage 104 included in the inspection apparatus 100, according to embodiments of the present disclosure. As shown in the example of FIG. 2, the stage 104 can include a surface 202. The surface 202 can be (e.g., substantially) flat, and shaped to hold the eyepiece(s) to be inspected. An opening 204 through the stage 104 and the surface 202 can allow the (e.g., white) light projected from the light source 106, below the stage 104, to enter at least a portion of the eyepiece that has been placed on the surface 202.

In some embodiments, the stage 104 can include a block structure 206 that is above the opening 204, such that the eyepiece is between the opening 204 and the block 206, and such that the block 206 is between the eyepiece and the camera 110. The block 206 is arranged to prevent light projected from the light source 106 from directly reaching the camera 110, which is placed substantially above the opening 204. The block 206 can ensure that the camera 110 detects the light that is reflected from the mirrors on the stage 104, but does not detect the light projected directly from the light source 106.

The stage can include one or more mirror supports 208 that each supports a mirror. Each mirror can be disposed to reflect any light, travelling outward in a transverse direction from the edge of the eyepiece, upward to the camera 110. Accordingly, the mirrors can be arranged at (e.g., approximately) a 45 degree angle relative to the surface 202. Thus, light that leaks through the edge sealant of the eyepiece, travelling in a substantially horizontal direction outward from the eyepiece, can be reflected upward to travel in a substantially vertical direction toward the camera 110, and the image(s) captured by the camera 110 can include the reflected light.

The stage can also be configured to further reduce the effect of stray light. The eyepiece can sit on the raised support in noncritical areas and the lip of the stage can be slightly higher than the bottom of eyepiece to block stray light between eyepiece and stage which can otherwise be difficult to filter out.

The (e.g., slit) mirror(s) can image the vertical edge of eyepiece into horizontal virtual images to be captured by the telecentric lens. Leakage within the numerical aperture (NA) of the mirror(s) and the NA of the lens can be collected on the camera. In some instances, the leakage may be well-focused (e.g., for orthogonal pupil expander (OPE) leakage) such that the structure of all (e.g., six) layers of waveguides are clearly visible. In other instances (e.g., incoupling grating (ICG) leakage), the leakage can be less focused.

The inspection apparatus illuminates the eyepiece with light from the light source 106. The light then travels through the wave guides of the eyepiece per the design of the eyepiece, until it reaches the edge sealant. Ideally, the edge sealant would prevent the light from leaking through the edge sealant, or reflecting back into the eyepiece, thus degrading the optical performance of the eyepiece. Any light that leaks through the edge sealant can be reflected upward by the mirror(s) and captured by the camera 110. Thus, the image(s) captured by the camera 110 can be analyzed to determine whether the eyepiece being examined exhibited light leakage through the edge sealant, indicating a flaw in the edge sealant.

In some embodiments, the white light from the light source 106 can be projected into a portion of the eyepiece that includes one or more filters, which split the white light into different color bands (e.g., ranges of wavelengths), such as different bands for red, green, and blue. The eyepiece can be designed with multiple layers, each layer providing a wave guide that is configured to guide a particular color band of the light. Thus, the filter(s) of the eyepiece can split the white light into different color bands that travel along different layers of the eyepiece. Any light escaping through the edge sealant can be in one or more of the color bands. Accordingly, the apparatus 100 can employ a color camera 110 that distinguishes the different colors of light. The different colors of light detected by the camera 110 can indicate light leakage through the edge sealant at the level, in the eyepiece, of the layer(s) that convey the detected colors of light. Thus, by distinguishing the color of the leaked light, the apparatus 100 can provide information regarding which layer(s) of the eyepiece the light is leaking from. The color camera is used to distinguish actual leakage (e.g., red, blue, or green) from stray light (e.g., white) that mainly includes from the LED light source, and some small amount of ambient light leaking into the enclosure. The LED can be high power, and thus exposure time is minimal, reducing the impact of surrounding environment. By distinguishing colors, the system can determine which layer the leakage is from, at least with respect to distinguishing leakage from layers that are waveguides for light of a different color (e.g., distinguishing red from green layers).

In some embodiments, analysis of the image(s) can include counting a number of pixels, in the image(s), for each detected color band (e.g., red, green, or blue). The pixel count(s) can be used to develop a quality metric for the eyepiece, indicating the leakage that is detected and that corresponds to the various layers in the eyepiece. Because different layers of the eyepiece have waveguides for different wavelength bands (color bands) of light, the differences in color leakage can indicate sealant problems at different layers in the eyepiece, such as insufficient sealant coverage at particular layer(s) that are the particular waveguide(s) for particular frequency band(s). If there is faulty sealant coverage at multiple layers, the image(s) could exhibit different colors of leaked light.

In some embodiments, the image(s) may be further examined to detect the location, in the image(s), of the light bands corresponding to edge-leaked light. The determination of the faulty layer(s) can be based on the detected locations of the light bands in the image(s). For example, six active layers leaking light from the edge could cause up to six bands of detected light leakage in the image(s). Color filtering in the captured image(s) and/or in the camera 110 itself could also reduce the effect of any stray light that penetrates to the interior of the enclosure 102, by filtering out the stray (e.g., white) light that may penetrate into the apparatus 100 from the exterior.

Based on the location of the light leakage from the edge, and because the mirror(s) are angled, light traveling out of the edge of a top layer travels further before reaching the mirror than light coming out of the edge of a bottom layer. Light from a top layer is seen by the camera as being further away from the center of an eyepiece than light coming from a bottom layer. This can help distinguish light leak areas if there are multiple layers guiding the same wavelength of light. For example, if there are two green layers within the eyepiece, this angled mirror system can distinguish which green layer a leak originates from based on the location of the light band in the image.

In some embodiments, the mirror(s) are disposed at a 45 degree angle relative to the broad surface of the eyepiece, or at approximately a 45 degree angle within a tolerable angular error. Other arrangements of the mirror(s) and camera can also be supported by embodiments. The 45 degree angled configuration enables the mirror(s) to reflect a vertical edge into a horizontal image for the telecentric lens, such that the edges that that are equally away from mirrors are equally well focused. There may be some difference in the case of the ICG area where the edge is curved toward the mirror, and the telecentric lens that is used can have a sufficient focal depth to accommodate this.

In some embodiments, the eyepiece can be illuminated with different wavelengths of light (different colors) to probe for any possible leakage at the different layers of the eyepiece. Alternatively, the eyepiece can be illuminated with white light, and the filter(s) in the eyepiece can split the light into constituent colors for the different layers to convey. This latter example may test the eyepiece under similar conditions to its normal operating conditions (e.g., in a virtual reality interface).

The use of multiple mirrors along the various edges of the eyepiece can allow one image to be captured that includes any light that may be leaking from any or all of the edges of the eyepiece. This may simplify the apparatus by enabling use of a single camera and providing a single set of images to be analyzed, instead of using multiple cameras that visualize the various edges and/or using a camera that moves around the edges of the eyepiece. Use of the mirrors inverts the light, and this inversion may be accounted for in the analysis of the image(s).

In some instances, different regions of the edge of the eyepiece may be more or less important with respect to performance of the eyepiece, and edge leakage in different regions may have a greater, or smaller, impact on the overall optical performance of the eyepiece. Thus, use of the inspection apparatus 100 can attempt to identify light leakage that may have a larger than tolerable impact on the overall performance of the eyepiece, based on which regions of the edge exhibit the detected light leakage. In general, the image(s) may be captured of an entire region of interest (ROI) that includes the entire edge of the eyepiece, and the subsequent image analysis can determine the overall quality of the eyepiece based on any detected light leakage and based on the relative importance of the various edge regions that exhibit the light leakage.

Figure 3A:
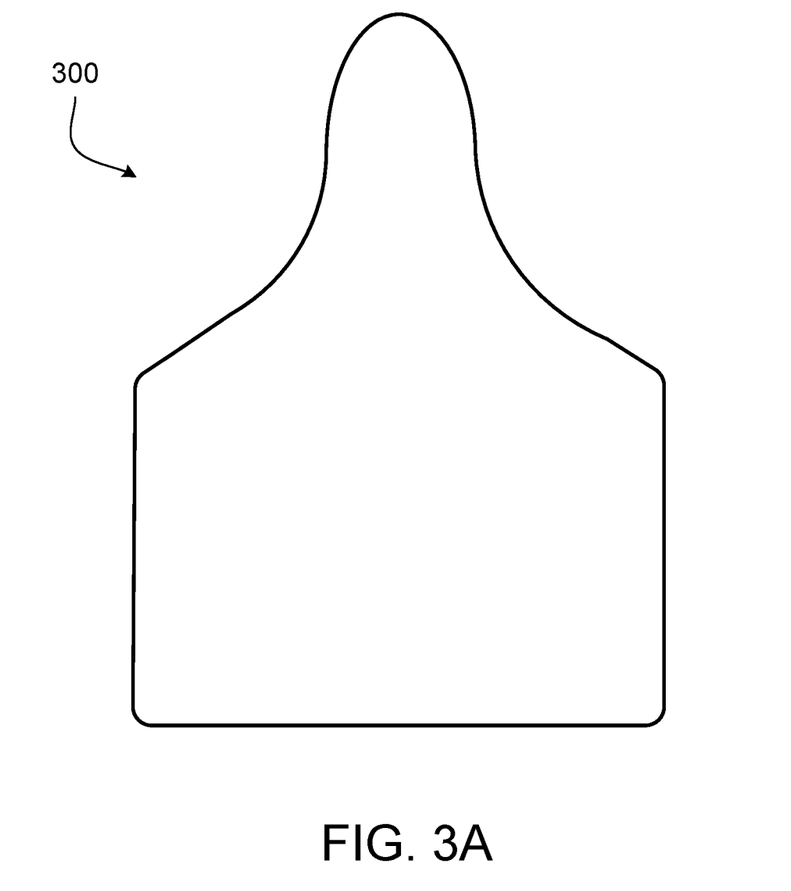
FIG. 3A depicts a schematic of an example optical device that can be inspected using the inspection apparatus, according to embodiments of the present disclosure.
Figure 3B:
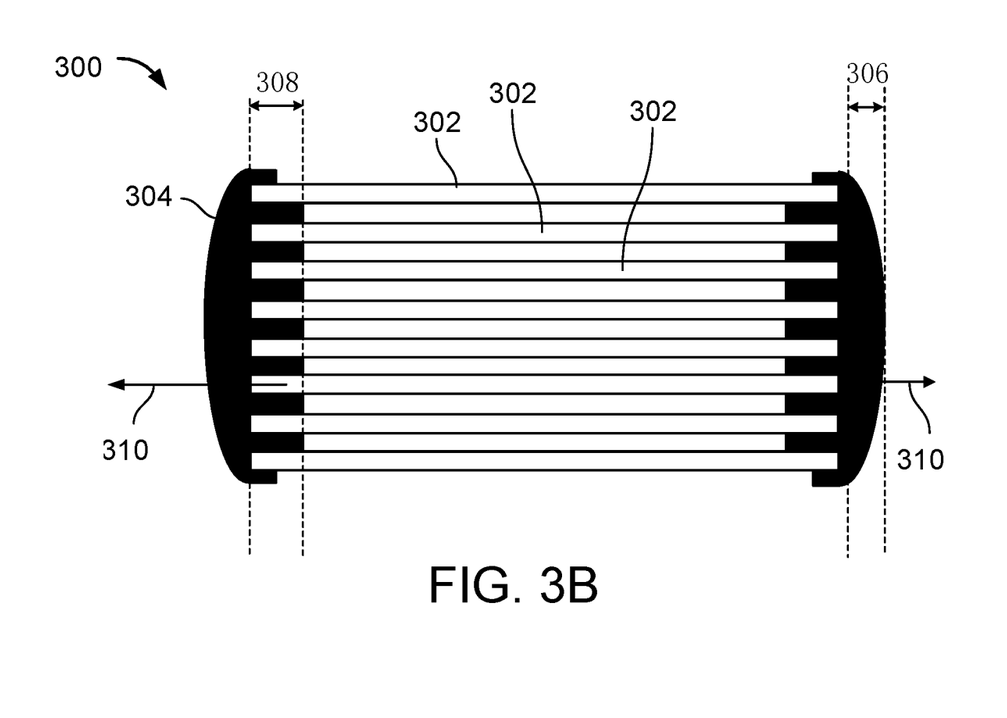
FIG. 3B depicts a cross-section schematic of an example optical device that can be inspected using the inspection apparatus, according to embodiments of the present disclosure.

FIG. 3A depicts an example optical device 300 that can be inspected using the inspection apparatus 100, according to embodiments of the present disclosure. Optical device 300 can be an eyepiece. FIG. 3B depicts a cross-section of optical device 300. The view shown is of a cross-section of an example eyepiece. As shown, the eyepiece can include multiple layers 302 that each provides a waveguide for a particular wavelength band of light. For example, different layers may be designed to guide red, green, or blue light. An edge sealant 304 may be applied to the edge of the eyepiece as shown, to attempt to prevent light leakage 310 from the interior to the exterior of the eyepiece in a transverse direction through the edge. The edge sealant 304 may also prevent reflection of light back into the interior of the eyepiece. The edge sealant 304 may be applied with an appropriate thickness 306, and may penetrate into the eyepiece, between the layers 302, to an appropriate depth 308. The eyepiece may be composed of multiple layers of (e.g., high index) glass in a stack.

The inspection apparatus described herein can be applied to any suitable type of optical device. In some examples, the eyepiece may be created at least in part using Jet and Flash Imprint Technology (J-FIL™), developed by Molecular Imprints™. The J-FIL technique may be used to create diffraction gratings on the layers of the glass of the eyepiece to create waveguide displays. Each layer may be a thin layer of glass with polymer gratings created on its surface using J-FIL. The diffraction gratings may provide the basic working functionality of the eyepiece. Once the diffraction gratings are formed onto a large, broad glass layer, the glass layer may be laser cut into the shape of the eyepiece. Other suitable substrate materials can also be used. Each layer of glass may be a different color, and there may be multiple depth planes. A larger number of planes may provide for a better virtual experience for a user using the eyepiece. The layers may be stacked using the sealant polymer (e.g., glue dots), and the whole stack may be sealed using the sealant. Air gaps between the layers may be preserved for the optical performance of the eyepiece. The gaps between the layers may have controlled dimensions (e.g., substantially uniform width). The edge sealant polymer may be applied around the edge of the layered structure to seal the stack and air gaps from the outside environment. The edge seal glue also provides a physical lock to ensure mechanical integrity of the structure, while keeping out contamination and moisture. Without such a seal, the layers may fall apart and delaminate from one another. The gap between layers may be of any suitable width to achieve the desired optical functionality. The leakage detection system described herein can be used to detect light leakage in eyepieces of any appropriate waveguide material.

The use of the sealant enables creation of high contrast eyepieces by absorbing stray light that hits the edges of the eyepiece layers. The sealant also provides structural integrity for (e.g., "locks in") the mechanical gap and co-planarity of the eyepieces. The eyepiece may have any suitable number of layers 302 of glass or other material, and each layer may act as a waveguide to allow the passage of various frequencies of light. Layers may be configured for particular wavelengths, so as to propagate light of a particular color, and the eyepiece may be configured for a particular optical power, to create a number of depth planes at which light through the waveguide may be perceived. For example, a first set of waveguide layers may include layers for red, green, and blue at a first depth plane, and a second set of waveguide layers may include a second set of layers for red, green, and blue light corresponding to a second depth plane. The order of the colors may be arranged differently in different depth planes to achieve the desired optical effects in the eyepiece. In some embodiments, a single (e.g., blue) layer may cover multiple depth planes. In some examples, the edge sealant may be a glue, resin, polymer sealant, ink, and/or other viscous material. The edge sealant may be black. Blackening an edge of the multi-layer eyepiece may cause the absorption of light impinging on the edge, and/or provide for reduced reflection of light impinging on the edge.

An image generated by the inspection apparatus 100 may be captured by the camera 110 during the inspection of the eyepiece for edge leakage. Any detected leakage may manifest itself in the image as one or more bands of (e.g., different colored) light, indicating that one or more layers of the eyepiece are exhibiting leakage.

In some embodiments, the eyepiece is illuminated through the color filter(s) of the eyepiece with a light source 106 that is a white spot LED. The red-green-blue (RGB) light filtered through the color filter(s) travel through the eyepiece, through a particular light path (e.g., ICG to OPE to exit pupil expander (EPE) to eye) in all of the layers of the eyepiece, in the same way as it would travel when the eyepiece is being used in the end product (e.g., a virtual reality interface projector and wearable). If an edge of a glass layer is not sufficiently covered by edge sealant polymer, light can leak out from the waveguide, be reflected by the mirror(s), and be imaged by the (e.g., telecentric) lens and color camera. By extracting colored pixels in the leakage ROI with a color library trained by testing actual eyepieces, the area of poor or no coverage can be calculated for each color at each ROI. As described above, different edge regions may provide different ROIs, which have different impacts on eyepiece optical performance. Weighted metrics can be derived from leakage in each of the ROIs to evaluate total impact due to edge leakage.

In some examples, the regions are listed in order of importance to eyepiece performance, the EPE bottom (more important), the ICG, and the OPE (less important). Due to how light travels inside the eyepiece, different ROIs can exhibit different amounts of leakage even when edge seals in the different regions are comparable in quality. For example, the ICG and OPE interior (e.g., nasal) sides may be easiest to inspect, due to abundant leakage. The OPE top side did not exhibit substantial leakage during testing, perhaps because the OPE grating does not lose a large amount of light in that direction. The EPE bottom did not exhibit much leakage in an eyepiece with severe leakage in the ICG and OPE areas, perhaps because significant light loss had already occurred through ICG and OPE prior to reaching EPE bottom. In some examples, for eyepieces with severe EPE-only leakage, green leakage was detectable, and red and blue leakage were not as prominent. Eyepieces may be inspected in the apparatus multiple times to ensure sufficient data collected for analysis and to diagnose possible issues present in the eyepieces. In some examples, total pixel counts of RGB in all ROI may be used as an overall metric for eyepiece quality. Different metrics weighted according to the differing ROI significance can also be derived. In some instances, a threshold metric can be applied to determine whether the eyepiece passes or fails inspection.

The inspection apparatus 100 can employ any suitable type of camera 110, such as a camera manufactured by Cognex™. In some embodiments, the stage 104 may be configured to support left and right eyepieces for inspection, where the left and right eyepieces have substantially the same shape and inverted. The left and right eyepieces can be later assembled into the wearable for commercial use. A vacuum pen or other suitable mechanism can be used to place an eyepiece on the stage 104 and remove the eyepiece from the stage 104. The apparatus 110 may be of any appropriate size. For example, the apparatus 100 (e.g., the enclosure) may have dimensions of 45 cm by 45 cm by 70 cm (height).

Figure 4:
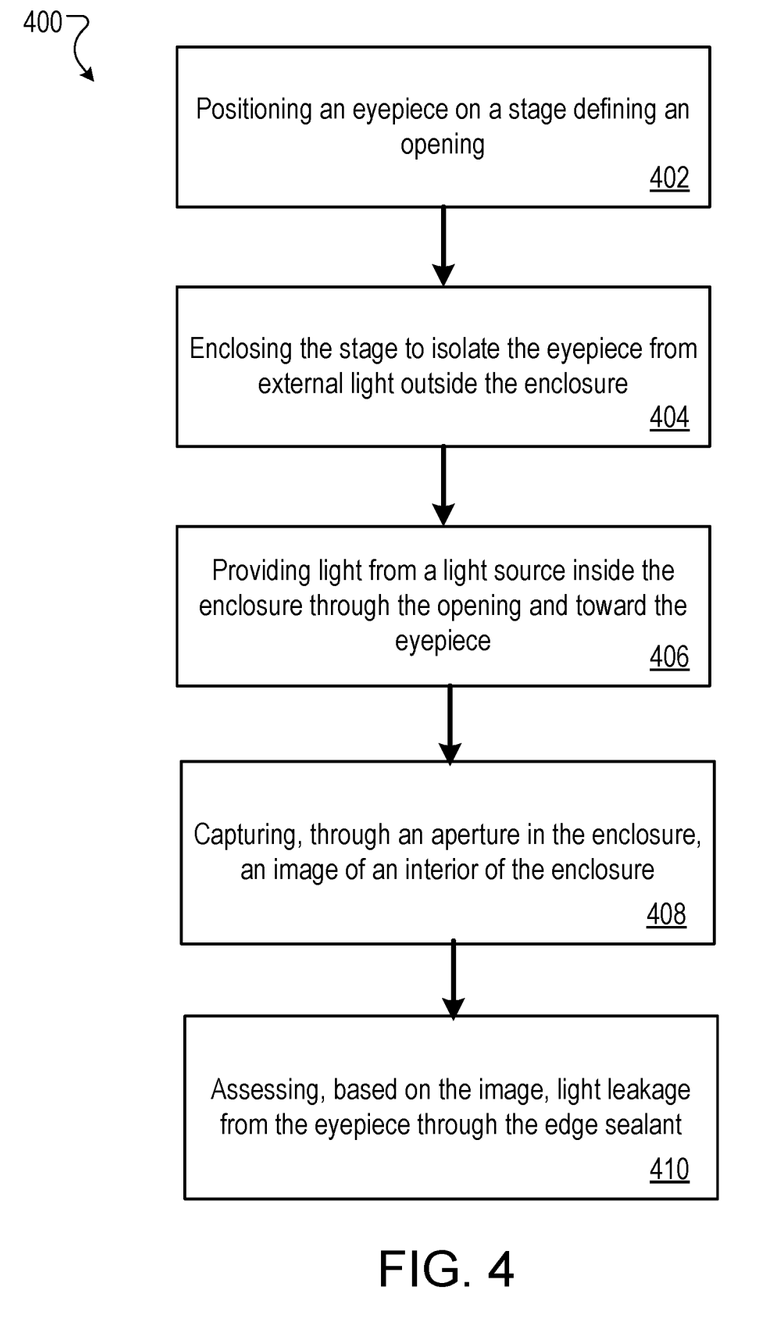
FIG. 4 is a flow chart showing operations in a process for detecting light leakage from an optical device.

Referring to FIG. 4, process 400 for inspecting an eyepiece includes several operations. In 402, an eyepiece having an edge sealant along at least one edge of the eyepiece is positioned on a stage defining an opening. The eyepiece typically includes multiple optics layers, each layer of which includes a wave guide for a particular color band. In some cases, the eyepiece includes a color filter configured to separate the white light into a plurality of color bands. In 404, the stage is enclosed to isolate the eyepiece from external light outside the enclosure. In 406, light is provided from a light source inside the enclosure through the opening and toward the eyepiece. The light may be provided to the color filter configured to separate white light into a plurality of color bands. Light from the light source can be white light. In 408, an image of an interior of the enclosure is captured through an aperture in the enclosure. The image may include pixels of at least one color band, thereby indicating leakage of the light through the edge sealant corresponding to at least one layer of the multiple optics layers. In 410, light leakage from the eyepiece through the edge sealant is assessed based on the image. In some cases, process 400 includes identifying a number of layers of the multiple optics layers through which leakage of the light occurs. In certain cases, process 400 includes identifying a location on the eyepiece corresponding to the leakage of the light. In certain cases, process 400 includes identifying, based on the pixels of the at least one color band, the at least one layer associated with the leakage of the light. The number of pixels of the at least one color band in the image may be assessed.

While this specification contains many specific details, these should not be construed as limitations on the scope of the disclosure or of what may be claimed, but rather as examples of features that are associated with particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

A number of embodiments have been described. Nevertheless, it will be understood that various modifications may be made without departing from the spirit and scope of the disclosure. For example, various structures shown above may be used, with elements rearranged, positioned differently, oriented differently, added, and/or removed. Accordingly, other embodiments are within the scope of the following claims.

What is claimed is:

1. An inspection apparatus for inspecting an eyepiece, the inspection apparatus comprising:
   a stage including a surface, an opening, and one or more mirror support structures that each supports a respective mirror;
   a light source arranged to project light through the opening of the stage and into a portion of the eyepiece when the eyepiece is resting on the surface of the stage;
   an enclosure that encloses the stage and the light source to isolate the eyepiece from external light from outside the enclosure; and
   a camera that is arranged to capture, through an aperture in the enclosure, at least one image of an interior of the enclosure, the at least one image including at least a portion of the light that leaks through an edge sealant of the eyepiece and that is reflected to the camera by the at least one mirror.

2. The inspection apparatus of claim 1, further comprising:
   an analysis module that receives the at least one image from the camera and that analyzes the at least one image to quantify light leakage through the edge sealant of the eyepiece.

3. The inspection apparatus of claim 1, wherein the stage further includes a block between the opening and the camera that prevents the light projected by the light source from directly reaching the camera.

4. The inspection apparatus of claim 1, wherein the one or more mirror support structures each supports the respective mirror to be disposed at approximately a 45 degree angle with respect to the surface of the stage.

5. The inspection apparatus of claim 1, wherein the camera includes a telecentric lens.

6. The inspection apparatus of claim 1, wherein light projected from the light source comprises white light.

7. The inspection apparatus of claim 6, further comprising the eyepiece.

8. The inspection apparatus of claim 7, wherein the eyepiece comprises multiple optics layers, and the edge sealant is disposed along at least one edge of the eyepiece.

9. The inspection apparatus of claim 7, wherein a portion of the eyepiece comprises at least one color filter to separate the white light into a plurality of color bands.

10. The inspection apparatus of claim 9, wherein each optics layer of the multiple optics layers comprises a wave guide for a color band of the plurality of color bands.

11. The inspection apparatus of claim 9, wherein the light is projected into the portion of the eyepiece that includes at least one color filter.

12. The inspection apparatus of claim 9, wherein the at least one image includes pixels of at least one of the color bands to indicate light leakage through the edge sealant corresponding to at least one layer of the multiple optics layers.

13. A method of inspecting an eyepiece, the method comprising:
positioning an eyepiece on a stage defining an opening, wherein the eyepiece comprises an edge sealant along at least one edge of the eyepiece;
enclosing the stage to isolate the eyepiece from external light outside the enclosure;
providing light from a light source inside the enclosure through the opening and toward the eyepiece;
capturing, through an aperture in the enclosure, an image of an interior of the enclosure; and
assessing, based on the image, light leakage from the eyepiece through the edge sealant.

14. The method of claim 13, wherein light from the light source comprises white light.

15. The method of claim 14, wherein the eyepiece comprises a color filter configured to separate the white light into a plurality of color bands, and providing the light toward the eyepiece comprises providing the light to the color filter.

16. The method of claim 15, wherein the eyepiece comprises multiple optics layers, each layer of which comprises a wave guide for a particular color band, and the image comprises pixels of at least one color band, thereby indicating leakage of the light through the edge sealant corresponding to at least one layer of the multiple optics layers.

17. The method of claim 16, further comprising identifying a number of layers of the multiple optics layers through which leakage of the light occurs.

18. The method of claim 16, further comprising identifying a location on the eyepiece corresponding to the leakage of the light.

19. The method of claim 16, further comprising identifying, based on the pixels of the at least one color band, the at least one layer associated with the leakage of the light.

20. The method of claim 19, further comprising assessing a number of the pixels of the at least one color band in the image.

* * * * *